United States Patent [19]
Shih

[11] Patent Number: 5,590,308
[45] Date of Patent: Dec. 31, 1996

[54] METHOD AND APPARATUS FOR REDUCING FALSE INVALIDATIONS IN DISTRIBUTED SYSTEMS

[75] Inventor: Yifong Shih, Cupertino, Calif.

[73] Assignee: International Business Machines Corporation, Armonk, N.Y.

[21] Appl. No.: 115,501

[22] Filed: Sep. 1, 1993

[51] Int. Cl.⁶ ..................................................... G06F 12/12
[52] U.S. Cl. ........................................... 395/463; 395/457
[58] Field of Search .................................... 395/425–447, 395/448, 449, 450, 451, 457, 463, 473, 468, 459

[56] References Cited

U.S. PATENT DOCUMENTS 4,843,542  6/1989  Dashiell et al. .......................... 395/446
4,928,225  5/1990  McCarthy et al. ....................... 395/472

OTHER PUBLICATIONS

L. Liu, "Increasing Hit Ratios in Second Level Caches and Reducing the Size of Second Level Storage," IBM Technical Disclosure Bulletin, vol. 27, No. 1A, Jun. 1984, pp. 334–337.

Primary Examiner—Eddie P. Chan
Assistant Examiner—Kevin L. Ellis
Attorney, Agent, or Firm—Baker, Maxham, Jester & Meador

[57] ABSTRACT

A distributed file system controls memory allocation between a global cache shared storage memory unit and a plurality of local cache memory units by calculating a variable global cache LRU stack update interval. A new update interval is calculated using fresh system statistics at the end of each update interval. A stack update command is issued at the end of the update interval only if the expected minimum data residency time in the global cache shared memory is less than or equal to the expected average residency time in the local cache memory.

20 Claims, 4 Drawing Sheets

METHOD AND APPARATUS FOR REDUCING FALSE INVALIDATIONS IN DISTRIBUTED SYSTEMS

BACKGROUND OF THE INVENTION

1. Field of the Invention

This invention relates to distributed file systems and, more particularly, to a method and apparatus for LRU stack synchronization between independent processors and a shared storage memory.

2. Description of the Related Art

In a distributed file system, a plurality of asynchronous processors, such as computers or workstations, are connected via a network. Each processor includes a local cache memory unit, which typically comprises a high-speed random access memory of from two to sixteen megabytes of storage capacity, and also includes a mass storage memory unit, typically a hard disk drive having from tens to perhaps hundreds of megabytes of storage capacity. The processors in the distributed file system typically need to share large blocks of data. Often the blocks of data are organized into pages, each of which contains four kilobytes of data. For efficient operation of the system, it is important to insure that the data blocks shared by the processors are quickly accessed and are consistent between the processors. Therefore, the processors are connected to a fast access, shared storage memory also referred to as a global cache. Although much data is shared across many processors, it is possible that none of the data used by any two processors will overlap. Therefore, the shared global cache memory typically has a capacity that is much larger than the sum of all the local cache memories in the processors.

The global cache memory contains data frequently accessed by the processors. It is faster for the processors to share data by obtaining it from the shared global cache memory rather than accessing the data from the hard disk drives of the appropriate processor. Moreover, it is easier to insure that data is consistent, meaning that all processors have the same value for the same shared data objects, by maintaining the data in the shared global cache memory. This consistency across processors is referred to as data coherency.

A least recently used (LRU) stack is maintained for the shared global cache memory and for each local cache memory associated with a processor. The LRU stack contains a list of data record-identifying indicia in the order of elapsed time since the last access, with the most recent at the top. For example, when a data record is first read into the cache memory, the indicia for that data record is placed at the top of the LRU stack. If a second data record is then read into the cache, then the first data record indicia is pushed down in the LRU stack and the indicia of the second data record becomes the top indicia in the stack.

If a data record already in a local cache is accessed, meaning that it is read or written over, then its indicia is moved to the top of the stack. As data records are accessed, their indicia are placed at the top of the LRU stack and the order of the stack changes. If a data record is not accessed for some time, eventually the data record indicia will be pushed down in the stack and will "fall off" the bottom of the stack. At that time, the data record is deleted from the local cache memory. If the associated processor requires the deleted data record, then the record must be obtained from the global cache memory or the appropriate hard drive and then will be placed back at the top of the stack. Similarly, the shared global cache memory maintains its LRU stack. As data records are brought into the global cache, they are placed at the top of the stack and old data records fall off the bottom of the stack and are deleted from the shared global cache memory.

When a processor writes to, or updates, its copy of a data record, it notifies the shared global cache memory of the write operation. Consequently, the LRU stack in the local cache memory and the LRU stack in the shared global cache memory are both updated at the same time. Before any other processor writes to a copy of that same data record in its respective local cache memory, that processor will check with the shared global cache memory, discover that the data record has been updated in the global cache, and will invalidate its copy of the data record and obtain a copy of the data record from the global cache. When a processor carries out a read operation on a data record and finds a copy of the data record in its local cache memory, referred to as a read hit, the processor will update the LRU stack associated with its local cache memory. One of the benefits of a distributed file system is the ability of the processors to independently carry out their tasks and only transfer data over the network when it is necessary for maintaining data coherency. It is not uncommon for a data record to be read many times by a processor without being written to. If every read hit in a local cache memory were followed by an LRU position update in the shared global cache memory, data coherency would be assured. Unfortunately, such a scheme has unacceptably large overhead and defeats many of the benefits of a multiple processor, distributed file system. Therefore, when a processor reads a data record from its local cache memory, it will update its LRU stack but will not notify the shared global cache memory of the read hit and therefore the LRU stack of the global cache will not be updated.

If a data record is read into both the shared global cache memory and a processor local cache memory, and is thereafter read many times by the processor but is not written to, then the data record may be at the top of the LRU stack for that local cache but might drop out of the LRU stack of the shared global cache. At the next data access by the processor, either a read operation or a write operation, the processor first will attempt to confirm with the shared global cache memory that its copy of the data record corresponds to the copy of the data record in the global cache. Because the data record will be missing from the global cache memory, the processor will assume its copy of the data record is invalid. Therefore, the processor will get the data record from the appropriate hard disk drive and will bring it back into both the shared global cache memory and the respective processor local cache memory. This invalidation of the local cache data record, even when the copy in local cache memory is actually valid, is referred to as false invalidation. Such false invalidations unnecessarily increase the time needed to carry out read and write operations at the local cache memory level. See, for example, U.S. Pat. No. 4,928,225 to McCarthy and "Increasing Hit Ratios in Second Level Caches and Reducing the Size of Second Level Storage" by L. Liu, IBM Technical Disclosure Bulletin, June 1984, pp. 334–337.

False invalidations occur either because the shared global cache memory is too small for the volume of data records used by the local cache memories or because the LRU stacks used in the global cache memory and local cache memories are not sufficiently coordinated, or synchronized. If the size of the global cache memory is less than the total effective size of the local cache memory, then false invalidations are inevitable. Conversely, a global cache memory that is as large as the total effective local cache memory does not guarantee a zero false invalidation rate because of the potential for unsynchronized LRU stack position of data indicia in the global and local cache memories. A larger shared global cache memory will reduce the false invalidation rate, but does so at the cost of additional memory. The memory size needed to eliminate false invalidations can be prohibitively expensive.

From the description above, it should be apparent that there is a need to reduce the number of false invalidations in a distributed file system without requiring excessively large shared global cache memory and LRU stack update rates. The present invention satisfies this need.

SUMMARY OF THE INVENTION

In accordance with the invention, a shared global cache memory LRU stack in a distributed file, multiple processor system is updated with local cache read hit data in accordance with a variable update interval. A global cache memory LRU stack update interval is determined for each processor that shares the global cache as a function of system operating statistical metrics from the most recent update interval. The statistics are continuously updated by the system. In this way, the global cache memory LRU stack is not updated with every read hit by a processor, thus reducing the overhead otherwise needed for updating the global cache memory LRU stack. The update interval is computed from system statistical metrics according to the relative size of the global cache and local cache. For a large system, in which the size of the global cache memory is much larger than the total size of the local cache memories, the update interval is equal to the expected minimum residency time in the global cache memory for a data record. Thus, for every data record in a local cache memory, the global cache memory LRU stack should be updated before the data record is deleted from the global cache memory due to lack of write or read miss operations. For small systems, in which the global cache is approximately equal in size to the total of local cache, the update interval is set equal to the expected average residency time in local cache memory. For large systems, using the expected average local cache residency time provides a more frequent, and therefore conservative, update interval frequency and can be used in place of the minimum global cache residency time. The update interval parameters are advantageously computed by the system automatically for purposes of system reports. Thus, the update interval determinations require very little additional overhead for the system. A memory management scheme in accordance with the invention reduces the rate of false invalidations and also reduces the size of the global cache memory otherwise needed to provide a zero false invalidation rate. In particular, a substantially zero false invalidation rate can be obtained with a global cache that is only as large as the sum of the local caches.

In another aspect of the invention, a global cache memory LRU stack update does not occur with every determined update interval. Rather, a global cache memory LRU stack update by a particular processor is performed only if the distributions of the local cache residency time and global cache residency time indicate that the expected minimum residency time in the global cache memory is less than or equal to the expected average residency time in the local cache memory. In this way, the frequency of LRU stack update operations is further reduced with no increase in false invalidations. If the inequality is not satisfied, then the expected minimum global cache residency time can be adjusted for a more conservative update interval and the comparison is repeated. In yet another aspect of the present invention, update intervals are further subdivided into observation intervals, during which the read hit data is updated without initiating an LRU stack update operation. The observation intervals help reduce the likelihood of missing bursts of read hit activity that might otherwise distort the system operating parameters used in calculating the next update interval. The observation intervals preferably occur at regular intervals during the update interval.

Other features and advantages of the present invention should be apparent from the following description of the preferred embodiment, which illustrates, by way of example, the principles of the invention.

DESCRIPTION OF THE PREFERRED EMBODIMENT

Figure 1:
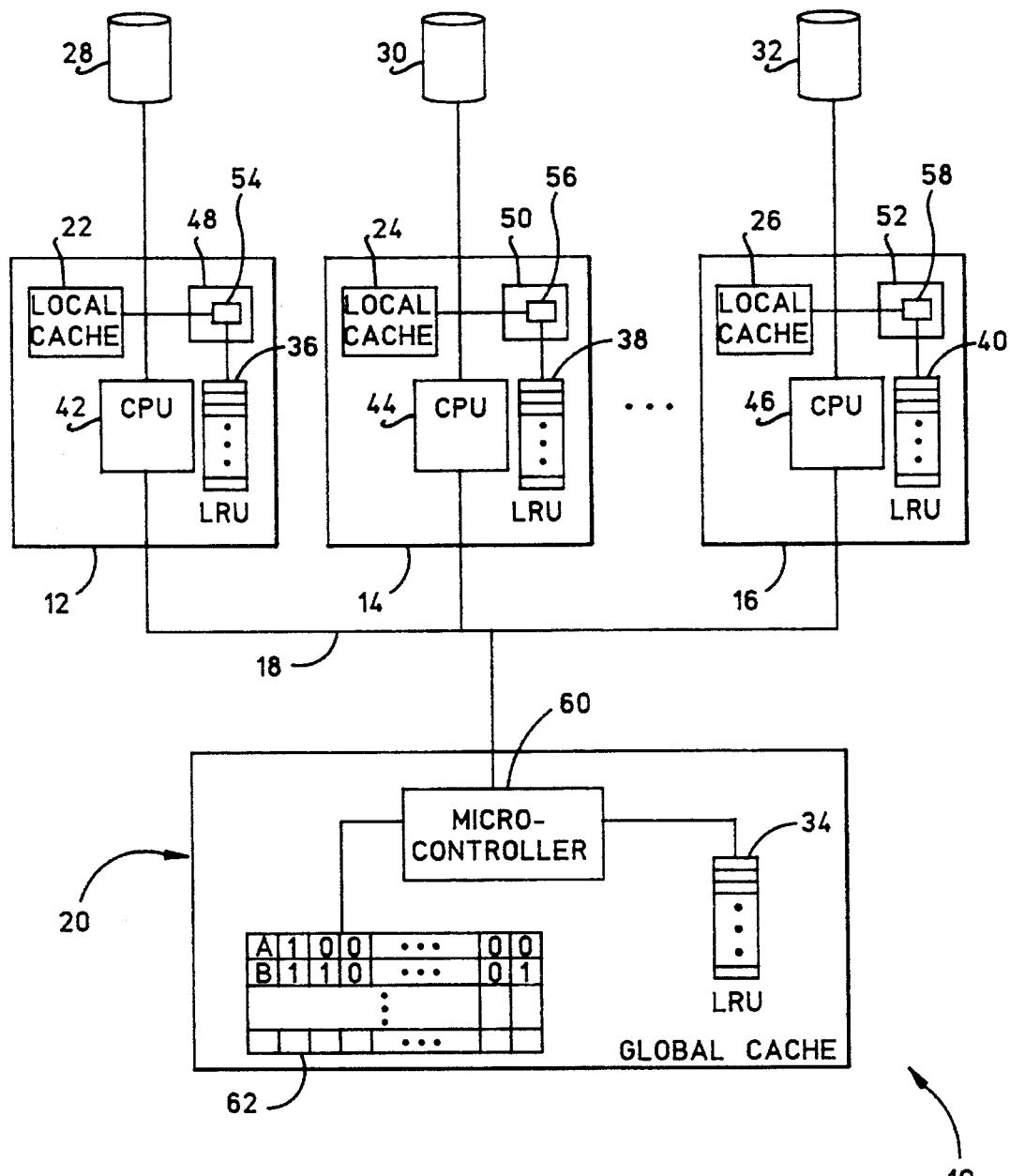
FIG. 1 illustrates a distributed file system constructed in accordance with the present invention.

FIG. 1 illustrates a distributed file system 10 constructed in accordance with the present invention is which a puralty of processore such as International Business Machines Corporation (IBM Corporation) System 390 processors, three of which 12, 14, 16 are illustrated, are interconnected via a network 18 to a shared, global cache memory unit 20 comprising a mass storage memory unit such as one or more hard disk drives or the like. Each of the processors 12, 14, 16 includes a local cache memory unit 22, 24, 26 such as high-speed random access memory or the like and a disk memory unit 28, 30, 32, respectively. The global cache memory unit 20 includes a least recently used (LRU) stack 34 and each of the local cache memory units 22, 24, 26 includes an LRU stack 36, 38, 40, respectively. Each LRU stack contains data record indicia that identify data records contained in the respective cache memory. In accordance with the invention, the global cache memory LRU stack 34 is updated with every write operation and read miss by a processor but is not updated with every read hit. Rather, read hit data from a processor is provided to the global cache memory unit 20 and its LRU stack 34 at a variable update interval that is determined by system operating statistical metrics. This reduces the network traffic and also reduces the false invalidation rate of the system substantially to zero without a significant increase in system overhead. Determination of the update interval is described in greater detail below.

Each processor 12, 14, 16 includes a central processor unit (CPU) 42, 44, 46 that controls basic operation of the respective processor and interfaces with the network 18. Each processor further includes a storage management controller 48, 50, 52 responsible for management of memory operations-and, in particular, includes an LRU stack controller 54, 56, 58 that controls the updating of the LRU sack 36, 38, 40. In particular, the LRU stack controller issues the LRU stack update command that provides the local cache read hit data to the global cache 20.

In operation, each processor 12, 14, 16 must request a copy of a data record from the global cache memory unit 20 before the processor can initially perform a read or write operation on the data record. A microcontroller 60 of the global cache memory unit will obtain the data record from the appropriate disk drive 28, 30, 32 and will provide a copy of the data record to the local cache of the requesting processor 12, 14, 16. Each data record is associated with a data record indicia that identifies the data record as having originated in a particular storage device of the system 10. When the data record is initially received by the global cache memory unit 20, the data record indicia is placed at the top of the global cache LRU stack 34.

For each data record in the global cache memory unit 20, there is a corresponding entry in a validity bit array 62 of the global cache. For each data record, the validity bit array includes a bit flag indicating the validity of the data record in each local cache. In FIG. 1, for example, the validity bit array entries for a data record "A" indicate that a valid data record is contained in the first processor 12 but in none of the others, whereas the array 62 indicates a valid copy of the data record "B" is contained in the first and second processors 12, 14 and in the last processor 16, but not in the others. As known to those skilled in the art, the hardware protocol for the system 10 requires that each processor must first check with the global cache validity bit array 62 to insure a valid copy of the data record exists in the local cache memory before accessing the data record. If the validity bit array indicates an invalid copy, then the processor requesting access to the data record invalidates its local copy and requests a valid copy from the global cache memory unit 20. In this way, the processors 12, 14, 16 determine if they have valid copies of data records when they request access for a read or write operation.

When a data record is provided to a local cache memory unit 12, 14, 16, the associated data record indicia is placed at the top of the corresponding LRU stack 36, 38, 40, respectively. Each time a data record is written to in a particular local cache memory, the corresponding data record indicia is brought to the top of the LRU stack for the local cache memory. At the same time, the write operation is communicated to the global cache memory unit 20 and the data record indicia is brought to the top of the LRU stack 34 of the global cache memory. Thus, every write operation results in an update to the LRU stack of the processor performing the write operation and also of the global cache memory. Those skilled in the art will appreciate that the validity bit array 62 also is updated with every write operation.

When a read hit occurs in a local cache memory unit 22, 24, 26, the corresponding processor 12, 14, 16 does not notify the global cache memory unit 20. This reduces network data traffic but eventually can lead to the local cache memory units and the global cache memory unit having unsynchronized LRU stacks, which leads to false invalidations. Therefore, for each processor, read hit data is provided to the global cache memory unit in the form of a global cache LRU stack update command that includes a list of the local cache data records that have received at least one read hit in the current update interval, in the order of most recently used to least recently used. If desired, the list can include the number of read hits associated with each data record for weighting, as described further below.

As noted above, read hit data from the LRU stack 36, 38, 40 of each processor 12, 14, 16 can be provided to the global cache memory unit 20 at the end of a global cache LRU stack update interval by the LRU stack manager 54, 56, 58.

In accordance with the invention, the update interval is selected such that it is equal to the expected minimum residency time in the global cache memory unit for a data record. The minimum residency time in the global cache is the data record residency time for any one data record if every data record in the cache memory is referenced once and only once. This value provides a lower bound for global cache residency time for typical systems, in which the size of the global cache memory unit 20 is much greater than the total size of the local cache memory units 22, 24, 26. Determining the update interval in this way means that, for every data record in a local cache memory, the global cache memory LRU stack should be updated before the data record is deleted from the global cache memory due to lack of write or read miss operations communicated to the global cache memory. In this way, the system 10 substantially eliminates false invalidations and also reduces the size of the global cache memory otherwise needed to provide a zero false invalidation rate.

Although a global cache memory typically is much larger than the total size of local cache memory, it would be advantageous to decrease the size of global cache memory if it can be done without increasing the false invalidation rate. The present invention achieves this reduction in size. If the size of the global cache memory unit 20 is as large as the total size of the local cache memory units, then the expected minimum residency time in the global cache is equal to the expected average residency time in a local cache. That is, for a system in which global cache size is equal to the total of local cache size, the minimum global residency time is equal to the average local residency time. Even for typical larger systems, in which the global cache size is greater than the sum of local cache sizes, the local cache average provides a more conservative interval than the global cache minimum and is preferred.

For a given cache memory, average residency time is equal to the cache memory size divided by the product of the cache input/output rate and miss ratio. Therefore, the global cache LRU stack update interval is determined for each processor 12, 14, 16 that shares the global cache memory unit 20 as a function of system operating parameters including the processor local cache memory size, the local cache input/output rate, and the local cache miss ratio. Thus, in accordance with the present invention, the update interval is equal to the local cache memory size divided by the product of the local cache input/output rate and the local cache miss rate for the most recent prior update interval. These parameters are continuously updated based on statistics from the most recent update interval. In this way, the global cache memory LRU stack is not updated with every read hit by a processor, thus reducing the overhead otherwise needed for updating the global cache memory LRU stack. The update interval parameters are generally computed by the system 10 automatically for purposes of system reports. Thus, the update interval determinations require very little additional overhead for the system.

It should be apparent to those skilled in the art that the initial update interval must be determined without the benefit of real-time system operating statistical metrics such as input/output rate and miss ratio. Therefore, the system 10 determines the initial value of the update interval using default values. For example, historical data for similarly configured systems is used to calculate an expected minimum global cache residency time. It has been found that the initial value of the update interval is not critical to optimal LRU stack synchronization if the initial value is not excessive. For example, an interval of two or three seconds, for most systems, should be sufficient. The initial update interval is best determined empirically or through simulation. Those skilled in the art will be able to determine a range of satisfactory values that can be used for the initial update interval, in view of the discussion above.

Updating the LRU stack 34 of the global cache memory unit 20 at the end of every update interval that is calculated as described above would reduce the number of LRU stack update operations as compared with updating after every read hit, while substantially eliminating false invalidations. In accordance with another aspect of the invention, however, further reductions to the number of LRU update operations can be achieved while still substantially eliminating false invalidations by performing a global cache memory LRU stack update not at the end of every update interval but instead only when needed, as indicated by the relative distributions of the expected local cache residency time and the expected global cache residency time. In particular, a global cache LRU stack update for a processor 12, 14, 16 is performed only if the distributions of the local cache residency time and global cache residency time indicate that the expected minimum residency time in the global cache memory unit 20 is less than or equal to the expected average residency time in the local cache memory unit 22, 24, 26. In this way, the frequency of LRU stack update operations is further reduced with no increase in false invalidations. If the inequality above is not satisfied, then the system 10 adjusts the expected minimum global cache residency time for a more conservative update interval, as described below, and the comparison is repeated.

Figure 2:
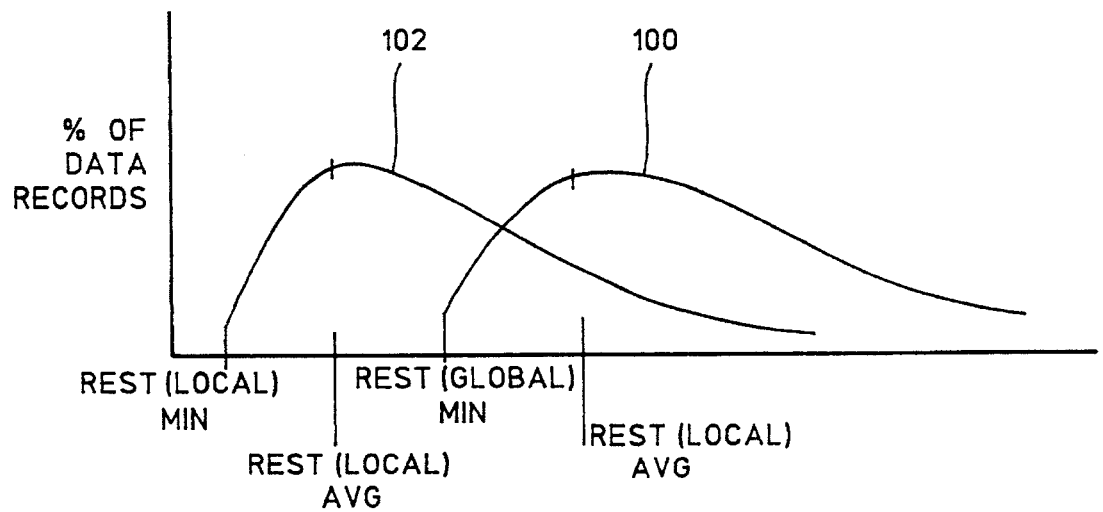
FIG. 2 and FIG. 3 illustrate the percentage of data frames found in local cache memory as a function of the minimum and average residency time distributions for thelocal cache memory and shared golbal cache memory.

The comparison of residency time distributions can be graphically represented by a plot of cache residency time. The residency time distributions for the global and local cache memories are characterized by their minimal and average residency times. In FIG. 2, the cache residency time distribution 100 for data records in a shared global cache memory has a minimum residency time greater than the average residency time for the corresponding cache residency time distribution 102 of a particular local cache memory. If the average residency time in the local cache is less than or equal to the minimum residency time in the global cache, then there is a high probability that a data record will fall out of the local cache memory before the global cache memory residency time expires. This would indicate that no update command should be necessary. The number of false invalidations can be represented by the overlapped area beneath the local cache memory residency time distribution and the shared global cache memory residency time distribution. The larger the overlapping area, the more false invalidations can be expected. Therefore, the average local cache residency time is compared to the minimum global cache residency time for a conservative decision heuristic.

Figure 3:
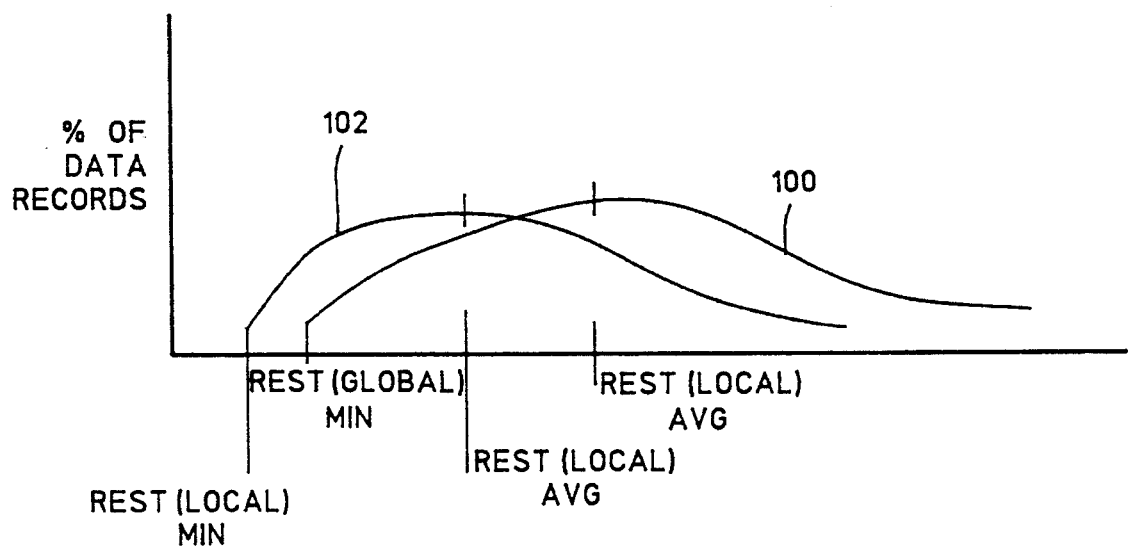

If the inequality is not satisfied and therefore the outcome of the comparison is false, then the situation is like that of FIG. 3 in which the average local cache residency time is greater than the minimum global cache residency time. Therefore, an adjusted minimum global cache residency time is calculated. The adjusted minimum global cache residency time is calculated by multiplying the minimum global cache residency time by the result of dividing the local cache miss ratio by the global cache miss ratio over the prior update interval. If the new, adjusted value for the minimum global cache residency time is less than or equal to the expected average local cache residency time, then the global cache LRU stack update should be performed at the end of the update interval. Thus, the appropriate processor 12, 14, 16 will issue an update command at the end of the update interval if these conditions are met. If neither inequality is satisfied, then no update command is needed and a new update interval will be calculated and started.

In another aspect of the present invention, update intervals are further subdivided into observation intervals, during which the local cache read hit data is updated without initiating a global cache LRU stack update command. The advantages of the observation intervals can be explained as follows. For a particular local cache memory, it is not uncommon for a data read operation to occur at a rate of approximately 600 per second. In accordance with the present invention, the global cache LRU stack update interval can be as large as, for example, ten seconds. A large number of data references within an extended 10-second update interval could result in bursts of read hits being lost in statistical averaging. For example, a small number of data records can be intensively referenced over an update interval such that the data records stay in the local cache memory at the end of the update interval. Because the number of references to these records during the update interval is much larger than the number of data records, the average residency time for the data in the local cache might not be increased sufficiently to warrant an update command. As a result, the data indicia may fall out of the global cache memory. Therefore, in one aspect of the present invention, observation intervals are defined within the regular update interval for purposes of collecting statistics.

The update interval may be divided, for example, into four observation intervals. Providing four observation intervals should prevent bursts of data access operations from being lost in statistical averaging without unnecessarily adding to system overhead. At the end of any observation interval, if the inequality used for determining whether a global cache LRU stack update command should be issued is satisfied, then a global cache LRU stack update command should be issued at the end of the update interval. That is, even if the stack update inequality is not satisfied for the last observation interval of an update interval, a stack update command should be issued if the stack update inequality was satisfied for any of the observation intervals. In addition, the observation intervals can be tailored for specific situations. For example, in the situation where update intervals are relatively lengthy, such as ten seconds or more, weights (numerical multipliers) can be placed on statistical metrics according to the sequence order of the observation interval such that statistics collected from early observation intervals are assigned lesser weights and statistics collected from later observation intervals are assigned greater weights. Alternatively, statistics from observation intervals having a relatively greater number of read hits can be more heavily weighted than statistics from observation intervals having a relatively lesser number of read hits. In this way, more recent or significant hits in the local cache memory will not become lost in statistical averaging and will not cause false invalidations in the next-succeeding update interval.

Figure 4:
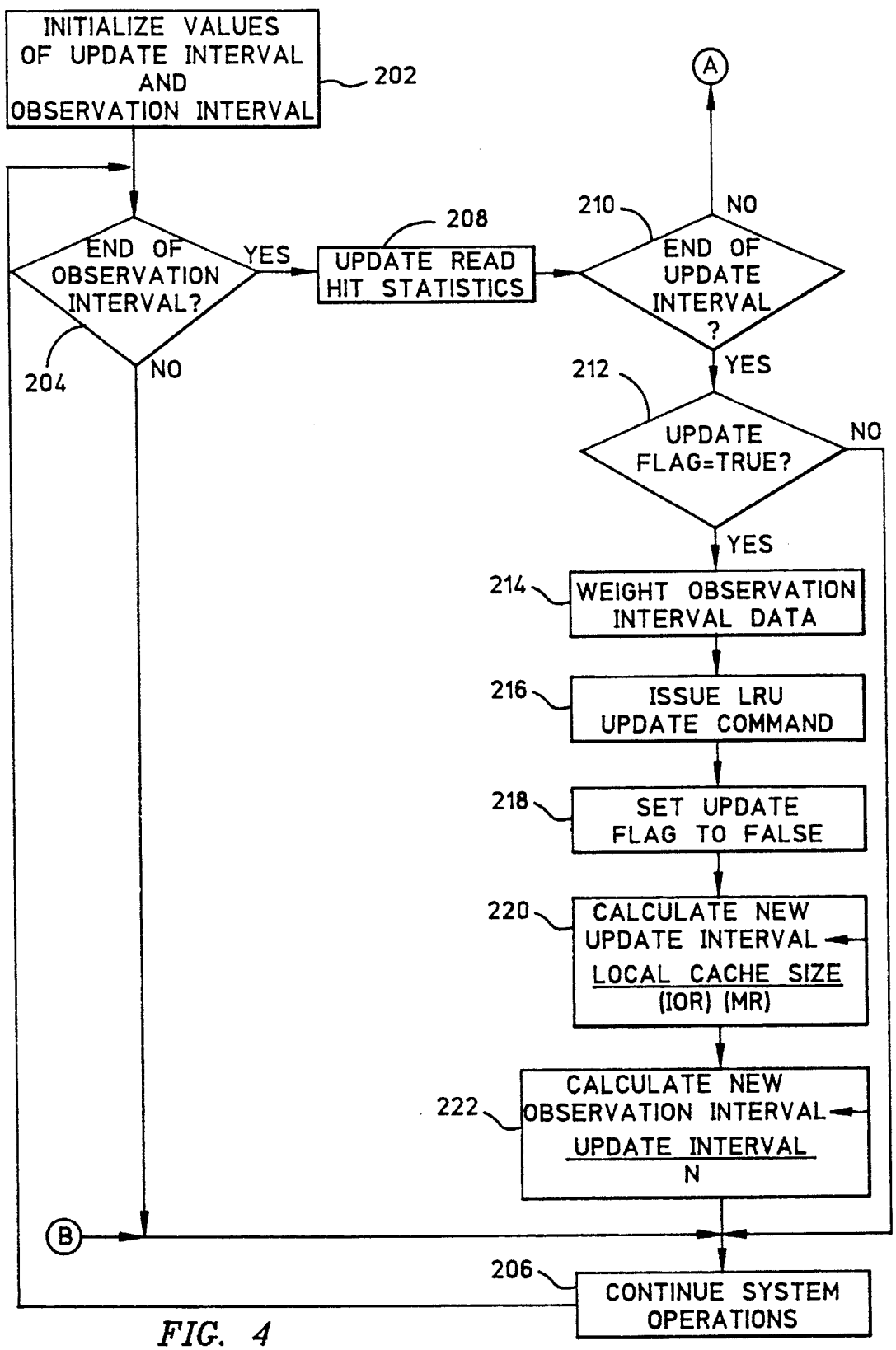
FIG. 4 and FIG. 5 are flow diagrams illustrating the sequence of operations carried out by the system of FIG. 1.

FIG. 4 is a flow diagram that illustrates the sequence of process steps followed by the system 10 illustrated in FIG. 1. The flow diagram can be implemented, for example, as a software program in each processor 12, 14, 16 (FIG. 1). At the first step indicated by the box numbered 202, a processor 12, 14, 16 initializes the values of the update interval and the observation interval. These values can be empirically obtained or otherwise determined by those skilled in the art, as described above. Next, the processor checks to determine if the end of an observation interval has been reached at the step numbered 204. If the end of an observation interval has not occurred, processing of access requests, collecting of statistics, and other system operations are continued at step 206. If the observation interval has ended, then the read hit statistics are updated at step 208. The statistics include read hit, data record access, and input/output data. Next, at step 210, the processor checks to see if the end of an update interval has been reached.

Figure 5:
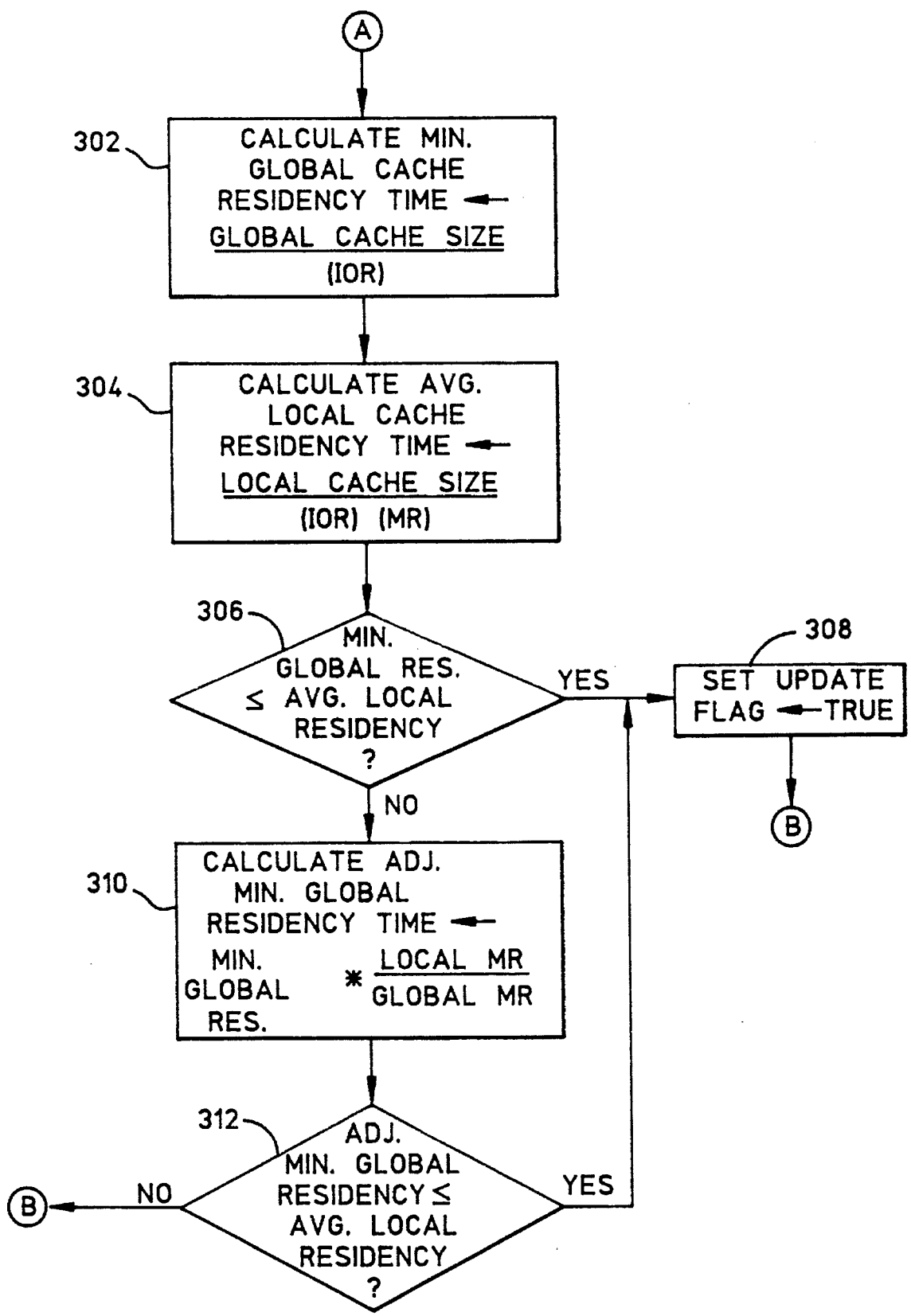

If the end of an update interval has not been reached, then processing continues with the steps illustrated by the flow diagram of FIG. 5, indicated by the off-page connector A. If the end of the update interval has been reached, then the processor 12, 14, 16 proceeds with update interval processing, as indicated at step 212. The process step 212 checks to determine if an update command flag has been set to a TRUE value. If the update command flag is not equal to TRUE, then no update command need be issued. As a result, the system continues operations at step 206, processing read and write requests and the like, and operations continue thereafter with the periodic check for the end of an observation interval at step 204. If the update command flag is equal to TRUE at step 212, then at step 214 the processor optionally weights the observation interval read hit data, which was collected at step 208. The weighting scheme, for example, can comprise selectively increasing the value or significance of data from observation intervals having a high number of read hits or increasing the data from more recently ended intervals. Those skilled in the art will recognize that this can be achieved through multiplication of the data by a numerical constant. Alternatively, this step can be skipped.

At the next step, indicated by the flow diagram box numbered 216, the LRU stack manager 54, 56, 58 (FIG. 1) issues an update command. After the update command is issued, the update flag is initialized by being set to a value of FALSE at step 218. Next, the processor 12, 14, 16 calculates a new update interval at step 220. The new update interval is equal to the local cache size divided by the product of the input/output rate of the processor and the miss ratio of the processor for the current observation interval. Next, at step 222, the processor calculates a new observation interval, which is equal to the new update interval divided by a predetermined integer N. As noted above, the integer is preferably equal to four. When the new update interval and observation interval have been calculated, processing continues at step 206 and thereafter with checking for the end of the next observation interval at step 204, as described above.

FIG. 5 illustrates the steps involved in processing at the end of an observation interval. In FIG. 4, if the end of an observation interval has been reached but the end of an update interval has not, then processing proceeds to the off-page connector A at FIG. 5. In the first step of observation interval processing indicated by the flow diagram box numbered 302, the minimum global cache residency time is computed as the result of dividing the global cache size by the global cache input/output rate. Next, at step 304, the processor 12, 14, 16 calculates the average local cache residency time, which is equal to the local cache size divided by the product of the local cache input/output rate and the local cache miss ratio for the current observation interval.

The processor next checks the residency distribution parameters by checking the relative values of the minimum global residency time and average local residency time. If the minimum global residency time is less than or equal to the average local residency time, then the update flag is set to TRUE at step 308 and thereafter processing is continued in FIG. 4, as indicated by the off-page connector at B. If the global minimum residency time is greater than the local average residency time, then the processor calculates an adjusted global minimum residency time at step 310. The adjusted global minimum residency time is equal to the unadjusted global minimum residency time multiplied by the result of dividing the local cache miss ratio by the global cache miss ratio for the current observation interval. Next, at step 312, the processor checks to see if the adjusted global minimum residency time is less than or equal to the local average residency time. If the adjusted global minimum residency time still is greater than the local average residency time, then processing is continued with the checking for an observation interval end at the off-page connector B. If the adjusted global minimum residency time now is less than or equal to the local average residency time, then the update flag is set to TRUE at step 308 and processing is continued with the observation interval check at the off-page connector B.

A better understanding of the operation of the system 10 can be gained from review of pseudocode that corresponds to the process followed by a processor 12, 14, 16 at the end of an observation interval. In the following pseudocode, the global cache LRU stack update command is referred to in abbreviated form as a PRL command, or processor reference list command. The process is represented in the pseudocode as a function "PRL issue", which issues the PRL command at appropriate times. Also in the pseudocode, the local cache memory units 22, 24, 26 are referred to by the abbreviation RSC, for Resource Storage Component. The global cache memory unit 20 is referred to by the abbreviation SES, for Shared Extended Storage.

The following is a list of variables used in the function PRL_issue:

| | |
|---|---|
| PRL_flag | set to TRUE if the PRL test passes in at least one observation interval |
| RSC_size | size of this local cache |
| SES_size | size of shared cache |
| PRL_interval | interval at the end of which decision must be made when to issue PRL or not |
| obs_interval | observation interval |
| n | integer multiple of obs_interval in a PRL_interval |
| RSC_interval_IOR | Io rate arriving at this local cache during the PRL interval |
| RSC_interval_MR | miss ratio at the local cache during the PRL interval |
| RSC_obs_interval_IOR | IO rate arriving at the local cache during the last observation interval |
| SES_obs_interval_IOR | IO rate arriving at the shared cache during the last observation interval |
| RSC_obs_interval_MR | miss ratio at the local cache during the last observation interval |
| SES_obs_interval_MR | miss ratio at the shared cache during the last observation interval |
| RESTAVG_RSC | average local cache residency time during the observation interval |
| RESTMIN_SES | minimum shared cache residency time during the observation interval |

The following pseudocode describes the process carried out by the system 10.

```
function PRL issue;
/*
 *This function is triggered at every observation
 *interval, where the PRL interval is some integer
 *multiple of the observation interval. This
 *function determines whether a PRL command,
 *containing all references that resulted in local
 *cache hits since last time a PRL was issued, is
 *necessary for this PRL interval.
 */
begin
 if at end of the current PRL_interval
 begin
        if PRL_flag = TRUE
        then issue PRL;
        PRL_flag         := FALSE;
        PRL_interval     := RSC_size / RSC_interval_IOR *
                             RSC_interval_MR;
        obs_interval     := PRL_interval / n;
 end
 else /* wake up at this observation interval */
 begin
        RESTMIN_SES := SES size / SES_obs_interval_IOR;
        RESTAVG_RSC := RSC_size / RSC_obs_interval_IOR*
                        RSC_obs_interval_MR;
        if RESTMIN_SES <= RESTAVG_RSC
        then PRL_flag := TRUE
        else
        begin
            /* Become more conservative and recalculate
             * minimum SES residency time
             */
            RESTMIN_SES := RESTMIN_SES *
            RSC_obs_interval_MR
                / SES_obs_interval_MR;
            if RESTMIN_SES <= RESTAVG_RSC
            then PRL_flag := TRUE
            /* go to sleep until the next observation
             * interval
             */
            else return;
        end;
 end;
```

In the pseudocode above, the end of an observation interval is assumed and therefore the pseudocode begins with a check to see if the value of the variable "PRL_interval" indicates that the current update interval has ended. The variable PRL_ interval can be, for example, a countdown clock that reaches zero at the end of the update interval. If the interval has ended, then the update command (PRL) is issued if the variable "PRL_flag" has been set to a value of TRUE. Thereafter, the flag is initialized to FALSE and processing for the next update interval and observation interval are commenced. As noted above, either the minimum expected residency time in the global cache or the average local cache residency time can be used to define the update interval. Most systems have a global cache that is much larger than the total of the local caches. For such systems, using the local cache average provides a more conservative interval than the global cache minimum. In addition, the size of the global cache can be reduced and the local cache average residency statistics can be used with no increase in the false invalidation rate. Also, as noted above, the integer multiple N by which the update interval, or PRL interval, is divided preferably is equal to four. If the update interval is not at its end, then the processing for the end of a particular observation interval is completed, indicated in the pseudocode by the comment field "wake up at this observation interval".

In the processing at the end of an observation interval, the expected minimum residency time in the global cache memory unit 20, the SES, is calculated by dividing the global cache size by the input/output rate at the global cache during the current observation interval. This is indicated in the pseudocode by the statement RESTMIN_SES:=SES_size/SES_obs_interval_IOR.

As noted above, initial values for such system parameters can be assumed at system start-up. Next, the expected average residency time in the particular local cache memory 12, 14, 16 is calculated by dividing the local cache memory size, or RSC size, by the product of input/output rate at the local cache for the current observation interval and the miss ratio for the local cache over the same observation interval. This is indicated in the pseudocode by the statement $$RESTAVG\_RSC := \frac{RSC\_size}{RSC\_obs\_interval\_IOR * RSC\_obs\_interval\_MR}.$$

As described above, if the expected minimum global cache residency time is less than or equal to the expected average local cache residency time, then a global cache LRU stack update command should be issued at the end of the update interval by setting the variable PRL_flag to a TRUE value. This is indicated in the pseudocode by the conditional statement if RESTMIN_SES<=RESTAVG_RSC then PRL_flag:=TRUE.

If the inequality for minimum global cache residency time and average local cache residency time is not satisfied, then the adjusted minimum global cache residency time is computed and another comparison is made before the system 10 concludes that a global cache LRU stack update command is not necessary. Such a situation corresponds to the relative distributions illustrated in FIG. 3, as described above. The system therefore uses a more conservative decision heuristic to avoid false invalidations by computing the adjusted minimum global cache residency time. The adjusted minimum global cache residency time is calculated by multiplying the minimum global cache residency time by the result of dividing the local cache miss ratio for the previous observation interval by the miss ratio for the global cache over the same observation interval. This is indicated in the pseudocode by the statement $$RESTMIN\_SES := RESTMIN\_SES * \frac{RSC\_obs\_interval\_MR}{SES\_obs\_interval\_MR}.$$

If the new, adjusted value for the minimum global cache residency time is less than the expected average local cache residency time, then an update command should be issued at the end of the update interval by setting the variable PRL_flag to TRUE. This is indicated in the pseudocode by the conditional statement if RESTMIN_SES<=RESTAVG_RSC then PRL_flag:=TRUE.

If the inequality still is not satisfied, then the global cache LRU stack update command can be skipped at the end of the update interval without danger of false invalidations. This is indicated in the pseudocode by the comment field "go to sleep until the next observation interval" followed by "return" and "end".

In accordance with the invention, the LRU stack of a global cache memory is updated at variable update intervals in accordance with system operating statistical metrics such as the minimum and average residency times of data records in local cache memory and in the global cache memory. Other statistical metrics also can be used. In this way, the rate of false invalidations is reduced without requiring excessive overhead or costly increases in the size of the global cache memory.

The present invention has been described above in terms of a presently preferred embodiment so that an understanding of the present invention can be conveyed. There are, however, many configurations for distributed file systems not specifically described herein, but with which the present invention is applicable. The present invention, therefore, should not be seen as limited to the particular embodiment described herein, but rather, it should be understood that the present invention has wide applicability with respect to distributed file systems generally. All modifications, variations, or equivalent arrangements that are within the scope of the attached claims should therefore be considered to be within the scope of the invention.

I claim:

1. A method of reducing false invalidations in a distributed file, multiple processor system having a plurality of processors coupled to a global cache memory, each processor being connected to a central processor unit, local cache memory, and mass storage unit, the global cache memory and each local cache memory maintaining a least recently used (LRU) stack that contains identification indicia for each data record contained in the corresponding cache memory for selectively determining which data records shall be deleted, each read miss and each write operation by a processor resulting in an update to operating system statistical metrics, including a cache memory data input/output rate and miss ratio, and to the global cache LRU stack and the local cache memory LRU stack of the processor, the method comprising the steps of:

responding to each read hit by a processor by updating the local cache memory LRU stack associated with that processor;

defining an update interval of the global cache memory LRU stack as a function of a predetermined statistical metric of data residency time for the local cache memory; and updating the global cache memory LRU stack no more frequently than at the expiration of the update interval in response to the read hit.

2. A method as defined in claim 1, wherein the predetermined statistical metric is computed from the operating system statistical metrics and comprises calculated average residency time for a data record in the local cache memory of the processor and is defined as the local cache memory size divided by the product of the local cache memory input/output rate and the local cache memory miss ratio.

3. A method of reducing false invalidations in a distributed file, multiple processor system having a plurality of processors coupled to a global cache memory, each processor being connected to a central processor unit, local cache memory, and mass storage unit, the global cache memory and each local cache memory maintaining a least recently used (LRU) stack that contains identification indicia for each data record contained in the corresponding cache memory for selectively determining which data records shall be deleted, each read miss and each write operation by a processor resulting in an update to operating system statistical metrics, including a cache memory data input/output rate and miss ratio, and to the global cache LRU stack and the local cache memory LRU stack of the processor, the method comprising the steps of:

responding to each read hit by a processor by updating the local cache memory LRU stack associated with that processor;

defining an update interval of the global cache memory LRU stack as a function of a predetermined statistical metric of data residency time for the local cache memory; and updating the global cache memory LRU stack at the expiration of the update interval, wherein:

the step of defining an update interval of the global cache memory LRU stack comprises calculating residency time metrics from the operating system statistical metrics, the residency time calculation comprising the steps of calculating a minimum residency time for a data record in the global cache memory defined as the global cache size divided by the global cache memory data input/output rate; and calculating an average residency time for a data record in the local cache memory defined as the local cache memory size divided by the product of the local cache memory data input/output rate and the local cache memory miss ratio;

and wherein the global cache memory LRU stack is updated at the expiration of the update interval only if the calculated minimum residency time in the global cache memory is less than or equal to the calculated average residency time in the local cache memory.

4. A method as defined in claim 3, wherein the step of determining an update interval further comprises:

calculating an adjusted minimum residency time in the global cache memory if the calculated minimum residency time is greater than the calculated average residency time in the local cache memory, wherein the adjusted minimum residency time in the global cache memory is obtained by multiplying the calculated minimum residency time by the result of dividing the miss ratio in the local cache memory by the miss ratio in the global cache memory; and the global cache memory LRU stack is updated only if the adjusted minimum residency time in the global cache memory is less than or equal to the average residency time in the local cache memory.

5. A method as defined in claim 1, wherein the step of defining an update interval of the global cache memory LRU stack includes the step of defining multiple observation intervals within the update interval and maintaining a list of LRU indicia and corresponding read hit data during each observation interval and the step of updating the gobal cace memory LRU stack is performed during an observation interval only if any read hits occur during the observation interval.

6. A method as defined in claim 5, wherein the step of maintaining a list of LRU indicia includes the step of weighting the read hit data in accordance with an observation interval weight ranking of the observation interval during which the data was generated relative to the other observation intervals of the update interval.

7. A method as defined in claim 1, wherein the size of the global cache memory is at least as large as the total size of the local cache memories.

8. A method of synchronizing a global cache memory with one of a plurality of local cache memory units in a distributed file, multiple processor system having a plurality of processors, each of which includes a central processor unit and mass storage unit coupled to a respective one of the local cache memory units, the global cache memory and local cache memory units each maintaining a least recently used (LRU) stack that contains identification indicia for each data record contained in the corresponding cache memory for selectively determining which data records shall be deleted, each read miss and each write operation by a processor resulting in an update to operating system statistical metrics, including cache memory data input/output rate and miss ratio, and to the global cache memory LRU stack of the processor and its corresponding local cache memory LRU stack, the method comprising the steps of:

(a) defining an update interval;

(b) defining multiple observation intervals within the update interval;

(c) collecting read hit statistics for each data record in the local cache memory unit during each observation interval;

(d) setting an update flag by
   (i) calculating a value for minimum residency time in the global cache memory defined as the global cache size divided by the global cache memory data input/output rate;
   (ii) calculating an average residency time in the local cache memory defined as the local cache memory size divided by the product of the local cache memory data input/output rate and the local cache memory miss ratio; and
   (iii) setting the update flag to TRUE if the minimum residency time in the global cache memory is less than or equal to the average residency time in the local cache memory;

(e) updating the global cache memory LRU stack at the end of the update interval if the update flag is set to TRUE, and not updating the global cache memory LRU stack otherwise;

(f) setting a new update interval equal to the expected minimum residency time in the global cache memory; and (g) repeating steps (a) through (f) for each processor.

9. A method as defined in claim 8, wherein the step of defining an update interval comprises the step of:

setting the update interval equal to the value of dividing the global cache memory size by global cache memory data input/output rate based on historical operating system statistical metrics.

10. A method as defined in claim 8, wherein the step of defining an observation interval comprises dividing the update interval into a predetermined number of observation intervals.

11. A method as defined in claim 8, wherein the step of setting an update flag comprises:

detecting if the minimum residency time in the global cache memory is not less than or equal to the average residency time in the local cache memory and, if it is not, responding by:
   calculating a local cache miss ratio defined by the average residency time in the local cache memory divided by the minimum residency time in the local cache memory, which is defined as the local cache memory size divided by the local cache memory data input/output rate;
   calculating a global cache memory miss ratio defined by the average residency time in the global cache memory divided by the minimum residency time in the global cache memory, where average residency time in the global cache memory is defined as the global cache size divided by the product of the global cache memory data input/output rate and the global cache memory miss ratio;

defining an adjusted minimum residency time in the global cache memory to be defined by the product of the minimum residency time in the global cache memory and the result of dividing the miss ratio in the local cache memory by the miss ratio of the global cache memory; and setting the update flag to TRUE if the adjusted minimum residency time in the global cache is less than or equal to the average residency time in the local cache memory.

12. A method as defined in claim 8, wherein the step of setting a new update interval comprises setting the new update interval equal to the expected average residency time in the local cache memory unit.

13. A distributed file system comprising a plurality of processors, each of which includes a central processing unit, a local cache memory, a least recently used (LRU) stack that contains identification indicia for each data record contained in the corresponding cache memory for selectively determining which data records shall be deleted, a storage memory controller having an LRU stack manager, and a mass memory unit; a global cache memory having a microcontroller, LRU stack, and validity bit array, connected to the processors; and a network connecting the processors to the global cache memory; wherein:

the LRU stack manager of a processor includes means for updating the local cache memory LRU stack with each read miss and write operation by the processor and for updating data record statistical metrics, including a cache memory data input/output rate and miss ratio; and the central processing unit of a processor includes means for defining a global cache memory unit LRU stack update interval, during which the central processing unit collects read hit statistics on the data records contained in the local cache memory, and the LRU stack manager produces a global cache memory LRU stack update command no more frequently than at the expiration of the update interval.

14. A distributed file system comprising a plurality of processors, each of which includes a central processing unit, a local cache memory, a least recently used (LRU) stack that contains identification indicia for each data record contained in the corresponding cache memory for selectively determining which data records shall be deleted, a storage memory controller having an LRU stack manager, and a mass memory unit; a global cache memory having a microcontroller, LRU stack, and validity bit array, connected to the processors; and a network connecting the processors to the global cache memory; wherein:

the LRU stack manager of a processor includes means for updating the local cache memory LRU stack with each read miss and write operation by the processor and for updating data record statistical metrics, including a cache memory data input/output rate and miss ratio; and the central processing unit of a processor includes means for defining a global cache memory unit LRU stack update interval, during which the central processing unit collects read hit statistics on the data records contained in the local cache memory, and the LRU stack manager produces a global cache memory LRU stack update command at the end of the update interval;

wherein the defining means defines an LRU stack update interval as a function of data record statistical metrics.

15. A system as defined in claim 14, wherein the defining means selects statistical metrics including minimum residency time in the global cache memory, defined as the global cache size divided by the global cache memory data input/output rate and average residency time in a local cache memory, defined as the local cache memory size divided by the product of the local cache memory data input/output rate and the local cache memory miss ratio, for defining the LRU stack update interval.

16. A system as defined in claim 15, wherein:

the central processing unit further includes means for defining a minimum residency time in the global cache memory as:
- global cache memory size divided by global cache memory data input/output rate;
- defines an average residency time in a local cache memory as: the local cache memory size divided by the product of the local cache memory data input/output rate and the local cache memory miss ratio;
- and further for defining the update interval to be equal to the minimum residency time in the global cache memory value; and the LRU stack manager further includes means for defining a global cache memory LRU stack update command only if the minimum residency time in the global cache memory is less than or equal to the average residency time in the local cache memory.

17. A system as defined in claim 16, wherein:

the central processing unit further includes means for defining an adjusted minimum global cache memory residency time if the minimum residency time in the global cache memory is not less than or equal to the average residency time in the local cache memory, wherein an adjusted global cache residency time is defined by the product of the minimum residency time in the global cache memory and the result of dividing the miss ratio in the local cache memory by the miss ratio of the global cache memory, wherein the local cache memory miss ratio is defined as the average residency time in the local cache memory divided by the minimum residency time in the local cache memory and wherein the global cache miss ratio is defined as the average residency time in the global cache memory divided by the minimum residency time in the global cache memory; and the LRU stack manager produces a global cache memory LRU stack update command only if the adjusted minimum global cache residency time is less than or equal to the average residency time in the local cache memory.

18. A system as defined in claim 17, wherein the defining means of the central processing unit defines multiple observation intervals within an update interval and updates the read hit statistics during an observation interval only if any read hits have occurred in the observation interval.

19. A system as defined in claim 18, wherein the defining means of the central processing unit weights the read hit statistics in accordance with an observation interval weight ranking of the observation interval during which the data was generated relative to the other observation intervals within the update interval.

20. A system as defined in claim 18, wherein the defining means of the central processing unit weights the read hit statistics in accordance with the relative number of read hits during the observation interval.

* * * * *

UNITED STATES PATENT AND TRADEMARK OFFICE
CERTIFICATE OF CORRECTION

PATENT NO.   : 5,590,308
DATED        : December 31, 1996
INVENTOR(S)  : Shih

It is certified that error appears in the above-indentified patent and that said Letters Patent is hereby corrected as shown below:

Column 14, line 53, change "cace" to --cache--.

Column 17, line 18, add --the-- between "by" and "global".

Signed and Sealed this

Sixteenth Day of December, 1997

Attest:

BRUCE LEHMAN

Attesting Officer

Commissioner of Patents and Trademarks